United States Patent [19]
Billarant

[11] Patent Number: 5,422,156
[45] Date of Patent: Jun. 6, 1995

[54] FASTENING MEMBER WITH FERROMAGNETIC ATTACHMENT STRIP

[75] Inventor: Patrick J. Billarant, Charlotte, N.C.

[73] Assignee: Aplix, Inc., Charlotte, N.C.

[21] Appl. No.: 52,379

[22] Filed: Apr. 23, 1993

[51] Int. Cl.$^6$ ............................................. A44B 21/00
[52] U.S. Cl. ................................ 428/100; 428/120; 428/124; 428/352; 428/354; 428/900; 24/306
[58] Field of Search ............... 428/100, 124, 120, 352, 428/354, 900; 24/306

[56] References Cited

U.S. PATENT DOCUMENTS

| | | | |
|---|---|---|---|
| 3,870,741 | 3/1975 | Kuhn | 264/46.4 |
| 4,693,921 | 9/1987 | Billarant et al. | 428/100 |
| 4,784,890 | 11/1988 | Black | 428/100 |
| 4,933,035 | 7/1990 | Billarant et al. | 156/155 |
| 5,286,431 | 2/1994 | Banfield et al. | 264/134 |

FOREIGN PATENT DOCUMENTS

| | | | |
|---|---|---|---|
| 168241 | 1/1986 | European Pat. Off. | B68G 7/12 |
| 2423666 | 11/1979 | France | F16B 6/07 |
| 2463870 | 2/1981 | France | F16B 11/00 |
| 2466330 | 4/1981 | France | B29D 27/04 |
| 9013133 | 1/1992 | Germany | B29C 67/20 |
| 225587 | 6/1989 | Japan | A44B 18/00 |

*Primary Examiner*—Alexander S. Thomas
*Attorney, Agent, or Firm*—W. Thad Adams, III

[57] ABSTRACT

A fastening member of the type characterized by having a base carrying on one side thereof gripping fastener hooks for mating connection with complementary gripping fastener fibrous patches. A protective cover engages the base for enclosing the hooks against leakage of molding liquid past the film onto the hooks to protect the hooks against clogging by a molding liquid when molding the fastening member into a molded article in a mold. In the improvement according to the invention, a flexible, granular ferromagnetic attachment strip is provided, and is positioned in overlying relation on top of the hooks. The attachment strip extends along the length of the fastening member within the area enclosed by the temporary thin protective film for being attracted to a magnet in the mold. The ferromagnetic attachment strip temporarily holds the fastening member by magnetic attraction in the mold during the molding process.

9 Claims, 5 Drawing Sheets

FASTENING MEMBER WITH FERROMAGNETIC ATTACHMENT STRIP

TECHNICAL FIELD AND BACKGROUND OF THE INVENTION

This invention relates to a fastening member of the type which is molded into molded foam cushions, such as seat cushions used in automobiles and other vehicles. The fastening members have hooks which mate with complementary fastening members which are attached to the inside of seat upholstery. When mated the fastening members position and secure the upholstery to the seat cushion. Prior art devices, including prior patents to the present assignee, include a covering film which encloses and protects the hooks of the fastening member from molding liquid until the liquid has cured and turned into a solid foam material. Then, the covering film is removed to expose the hooks and permit the fastening member to be used for its intended purpose.

The fastening members are generally held in mold pockets in the mold by magnetic attraction. The mold pockets contain powerful magnets. Most commonly, the covering film of the fastening member is bonded to intermittent strips of steel shim stock, which are attracted to the magnets in the mold pocket and hold the fastening member in the mold pocket. See, e.g., applicant's U.S. Pat. Nos. 4,933,035 and 4,693,921.

An alternative arrangement is shown in U.S. Pat. No. 4,784,890. In '890, a ferromagnetic coating is applied to the marginal areas of the fastening member along either side of the upstanding hooks. The ferromagnetic coating is intended to create a sufficiently good seal between the mold pocket and the fastening member that the protective film covering such as shown in the '035 and '921 Patents is unnecessary. Thus, the film removal step after molding is complete is eliminated in the '890 Patent.

However, the fastening member using the protective film covering has become the predominant method of using this form of seat upholstery attachment, since it is easier to position in the mold pocket and a more secure seal against molding liquid contamination of the hooks is provided. As noted above, this film must be removed before the fastening member can be used. It has been found that occasionally the removed protective film with the attached steel shim stock is inadvertently swept up with foam scraps for recycling. Scrap foam contaminated with this steel material is unusable. The protective film with the attached steel shim stock is also difficult to dispose of, since it is not recyclable either as a metal or plastic.

It has also been observed that if the steel shim stock becomes bent, it may cause the fastening member to bend as well, thus causing the fastening member not to lie flat in the mold pocket. In other words, the steel shim stock reduces the flexibility of the fastening member to a considerable extent.

The present invention solves these problems by utilizing a ferromagnetic coating in combination with the protective film covering the hooks of the fastening member, as described and claimed below.

SUMMARY OF THE INVENTION

Therefore, it is an object of the invention to provide a fastening member which is very flexible and which will lie flat in the mold pocket of a mold.

It is another object of the invention to provide a fastening member which does not have any rigid metal parts in the assembly.

It is another object of the invention to provide a fastening member in which the protective film covering is easy to remove from the fastening member after molding is complete.

It is another object of the invention to provide a fastening member which has an easy to dispose of protective film covering.

It is another object of the invention to provide a fastening member which has a protective film covering which will not contaminate foam scrap if inadvertently mixed with foam scrap.

These and other objects of the present invention are achieved in the preferred embodiments disclosed below by providing a fastening member of the type characterized by having a base carrying on one side thereof a first part of a gripping fastening member such as hooks for mating connection with a complementary second part of a gripping fastening member such as loops. A temporary cover engages the base for protecting the first gripping fastener part against leakage of molding liquid past the film onto the first gripping fastener part to protect the first gripping fastener part against clogging by a molding liquid when molding the fastening member into a molded article in a mold. The improvement comprises a flexible, granular ferromagnetic attachment strip positioned in overlying relation on top of the first gripping fastener part and extending along the length of the fastening member for being attracted to a magnet in the mold. The ferromagnetic strip temporarily holds the fastening member by magnetic attraction in the mold during the molding process.

According to another preferred embodiment of the invention, the base carries on one side a first part of a gripping fastening member for mating connection with a complementary second part of a gripping fastening member. A temporary thin protective film covers and sealingly engages the base for enclosing the first gripping fastener part against leakage of molding liquid past the film onto the first gripping fastener part to protect the first gripping fastener part against clogging by a molding liquid when molding the fastening member into a molded article in a mold. The improvement according to the invention comprises a flexible, granular ferromagnetic attachment strip positioned in overlying relation on top of the first gripping fastener part and extending along the length of the fastening member within the area enclosed by the temporary thin protective film for being attracted to a magnet in the mold to temporarily hold the fastening member by magnetic attraction in the mold during the molding process.

According to another preferred embodiment of the invention, the first gripping fastener part comprises numerous rows of hook-like projections for mating, releasable engagement with complementary gripping fastener parts.

According to yet another preferred embodiment of the invention, the first gripping fastener part comprises numerous rows of hook-like projections for mating, releasable engagement with a complementary loose, fibrous, non-woven patch comprising the second gripping fastener part.

According to yet another preferred embodiment of the invention, the ferromagnetic attachment strip comprises a mixture of a pressure sensitive adhesive and steel powder.

According to yet another preferred embodiment Of the invention, the ferromagnetic attachment strip comprises a mixture of a pressure sensitive adhesive and steel powder coated onto a thin plastic backing film.

According to yet another preferred embodiment of the invention, the ferromagnetic attachment strip comprises a mixture of a pressure sensitive adhesive and steel powder coated onto a thin paper carrier sheet.

Preferably, the ferromagnetic attachment strip comprises a mixture of approximately 60 parts of a pressure sensitive adhesive and approximately 40 parts of a steel powder, According to one preferred embodiment of the invention, the plastic backing film includes a silicone coating on the side of the thin plastic backing film obverse to the side on which the ferromagnetic material is coated for permitting the attachment strip to be produced in long lengths and rolled on itself without adjacent layers of the roll sticking to each other.

According to yet another preferred embodiment of the invention, the ferromagnetic attachment strip includes a pigment for coloring the attachment strip to contrast with the color of the base to permit easy visual determination that the attachment strip and the temporary thin protective film covering have been removed.

According to yet another preferred embodiment of the invention, the steel powder is mixed with the pressure-sensitive adhesive at a rate to provide the attachment strip with approximately 200 grams per meter squared of steel powder.

According to yet another preferred embodiment of the invention, the fastener strip is curved along its longitudinal axis to define an arc.

According to one preferred embodiment of the invention, the cover is formed of a layer of fibrous loops for mating connection with a plurality of hooks comprising the first gripping fastener part for securing the cover to the base and a substrate for carrying the layer of fibrous loops. The flexible, granular ferromagnetic attachment strip is positioned on face of the substrate obverse from the fibrous loops. A paper carrier sheet releasably is attached to the ferromagnetic attachment strip.

According to yet another preferred embodiment of the invention, the invention includes a tab formed on the end of the cover and extending beyond one end of the base for permitting the cover to be manually grasped and easily and quickly removed after the molding operation is completed.

According to yet another preferred embodiment of the invention, the tab is integrally formed with and comprises an extension of the cover, and the tab is folded over itself and releasably attached to the cover.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
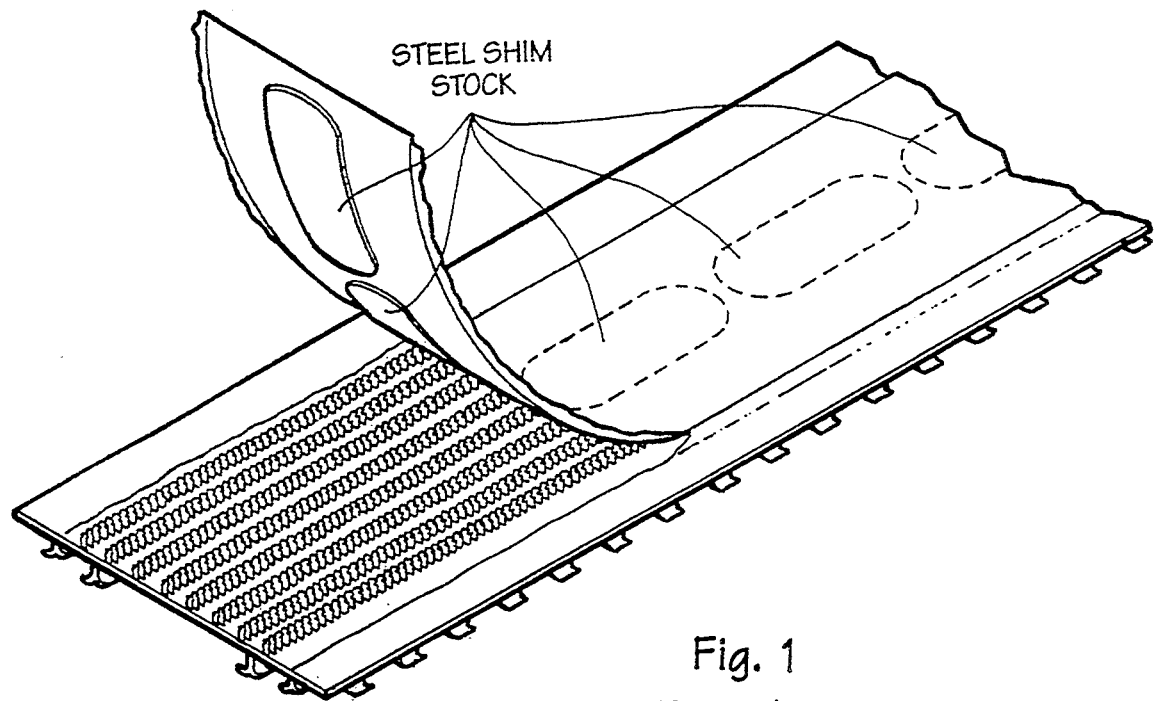
FIG. 1 is a perspective view of a fastening member according to an embodiment of the prior art.

Referring to FIG. 1, a fastening member according to a typical prior art embodiment is shown. The fastening member includes a covering protective film which is removed from the base of the fastening member after molding is complete. The fastening member is held in the mold by lengths of steel shim stock which are secured to the protective film covering.

Figure 2:
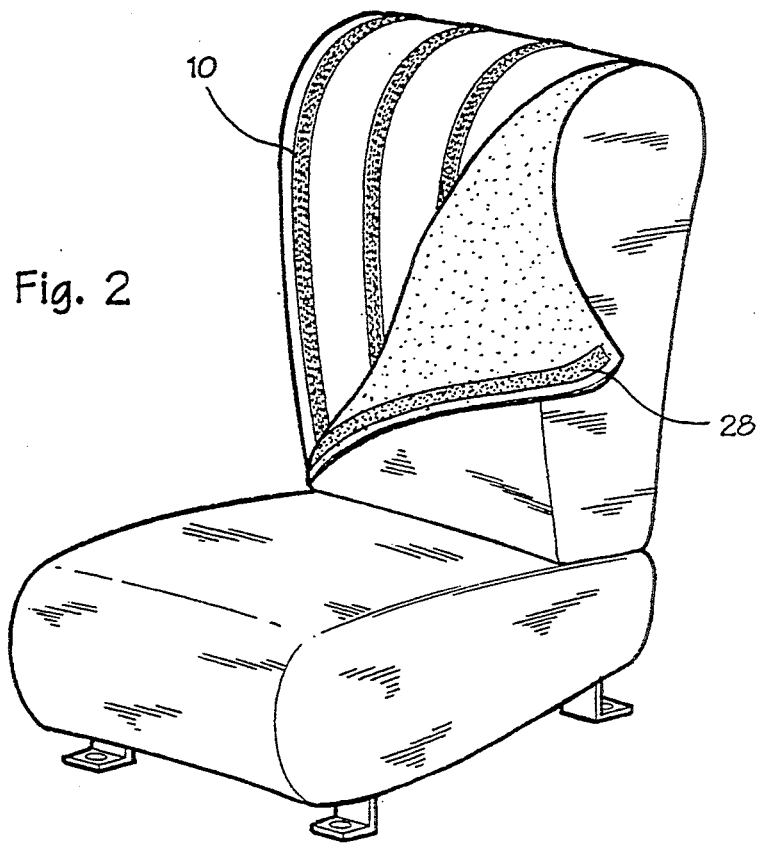
FIG. 2 is a perspective view of a foam seat cushion with a fastening member according to an embodiment of the invention molded into place to receive a complementary seat cover.

Referring now specifically to FIG. 2, a fastening member according to the present invention is illustrated and shown generally at reference numeral 10. In the preferred embodiment disclosed in this application, the fastening member 10 is shown in the environment of a polyurethane foam molded seat cushion of the type used in vehicle seats. Fastening members 10 can be molded into the seat bottom or backrest in any desired pattern or arrangement to accommodate the design of the seat and of the seat cover to be held in place. The invention also has application in many other structures, such as headliners and in furniture.

Figure 6:
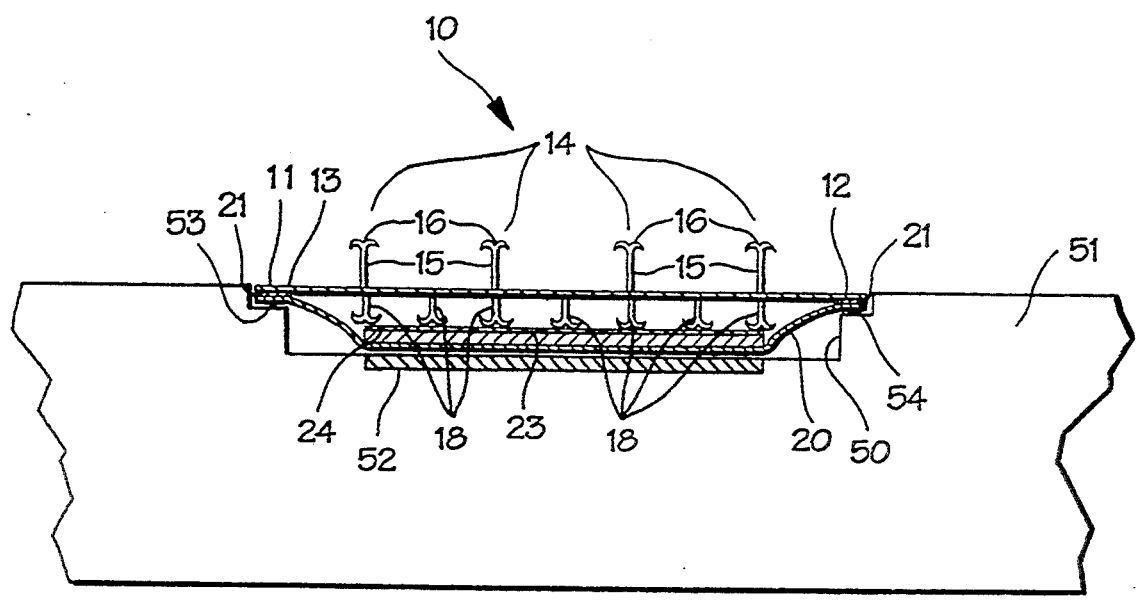
FIG. 6 is a cross-sectional view illustrating use of the fastening member in a foam molding operation.

As is shown in FIG. 6, fastening member 10 is molded into a foam cushion by placing the fastening member 10 into a mold pocket 50 in a seat cushion mold 51. The mold pocket 50 is provided with magnets 52 which are intended to hold the fastening member 10 firmly in the mold pocket 50, as described in more detail below.

Figure 3:
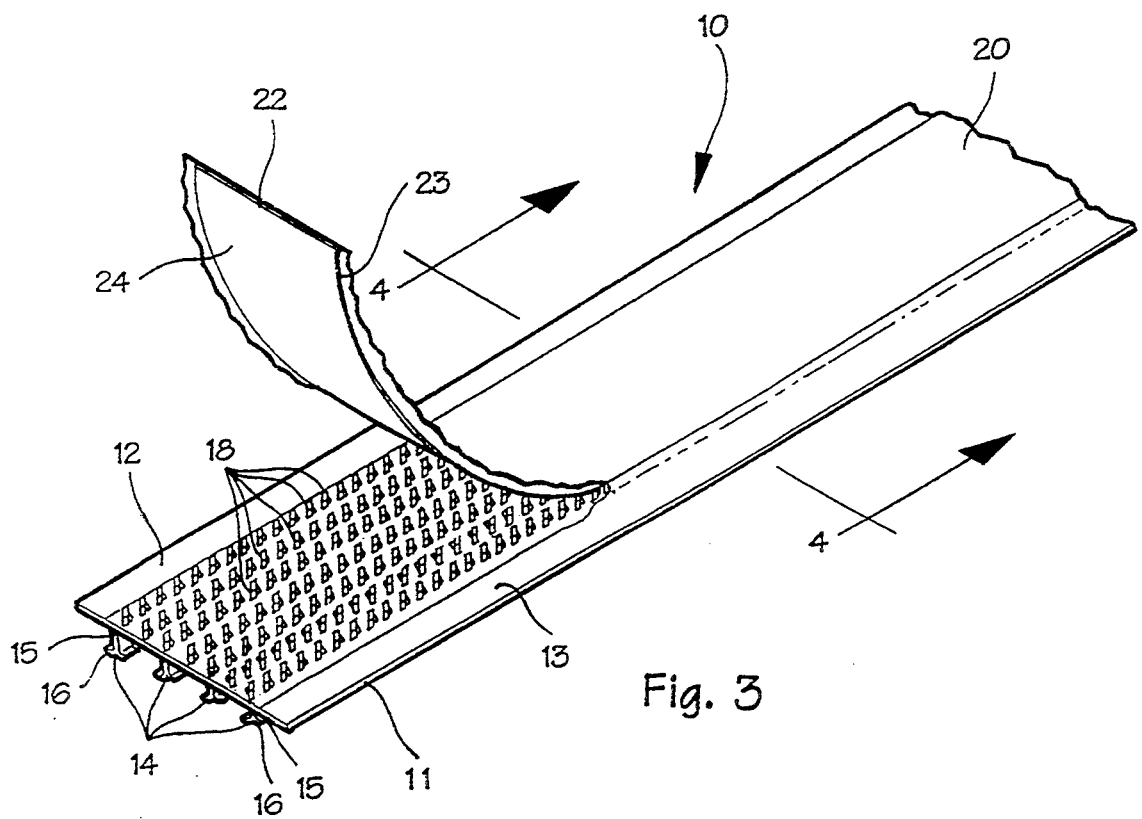
FIG. 3 is a perspective view of a length of fastening member according to the invention.
Figure 4:
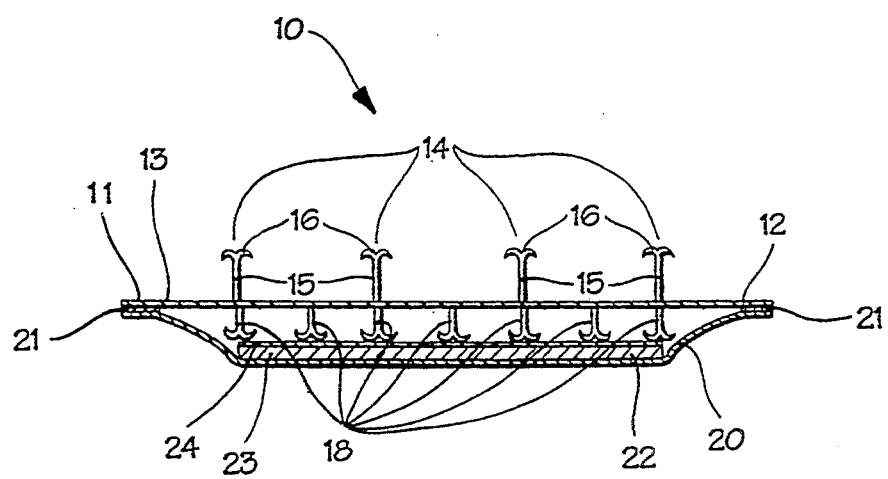
FIG. 4 is an enlarged cross-sectional view of the fastening member in FIG. 3 taken substantially along lines 4—4 of FIG. 3.

Referring now to FIGS. 3 and 4, a fastening member according to a preferred embodiment of the invention is illustrated in greater detail. Fastening member 10 includes a base 11 of a molded plastic material. The opposing side edges 12 and 13 define flanges which are positioned on the flanges 53 and 54 of the mold pocket 50 (See FIG. 6) when the molding process starts. Several rows of anchoring elements 14 are integrally molded into one side of the base 11. These anchoring elements 14 have outwardly extending stems 15 carrying enlarged heads 16. The heads 16 made be of any suitable shape, but as shown are "anchor" shaped and provide enlarged surfaces which are molded into the foam and which provide substantial resistance against being dislodged.

Thus, as shown in FIG. 6, the anchoring elements 14 project outwardly away from the mold 51 and are intended to be immersed in the molding liquid when the molding process begins.

As is also shown in FIGS. 3 and 4, the other side of the base 11 carries a large number of rows of relatively small, outwardly extending hook-like projections 18. These hook-like projections are intended to mate with patches 28 of complementary loose, fibrous, non-woven material attached to and carried by the seat cushion which is to be eventually placed over the foam cushions. See FIG. 2. The hooks 18 are ensnared in the fibrous material of the patches 28 and provide a secure attachment which can nevertheless be loosened when necessary.

In the fastening member 10 according to the embodiment of the invention disclosed herein, the hook-like projections 18 are covered and enclosed by a temporary protective film 20. Preferably, the protective film 20 is attached along opposite sides by hot-melt adhesive 21 or by sonic welding (not shown), and on opposite ends of each fastening member 10. However, the ends may be left unsealed if desired, since placement of the fastening member 10 in the mold pocket 50 will seal the ends by magnetic attraction. The protective film 20 protects the hook-like projections 18 from contamination by molding liquid during the molding process.

In accordance with the invention, the fastening member 10 is held in the mold pocket 50 by magnetic attraction. Magnetic attraction is accomplished by providing a magnetic attachment strip 22 which is positioned in overlying relation on top of the hook-like projections 18. The magnetic attachment strip 22 extends along the length of the fastening member 10 within the area enclosed by the temporary thin protective film 20 for being attracted to the magnet 52 in the mold 51. FIG. 6.

The magnetic attachment strip 22 is constructed by mixing approximately 60 parts acrylic water-based pressure sensitive adhesive, having about 50% solids, with 40 parts steel powder granules having an average diameter of 150 microns. Approximately 2 parts of pigment can be added to increase the contrast between the color of the base 11 and the magnetic attachment strip 22 in order to more easily determine if the magnetic attachment strip 22 has or has not been removed.

The pressure sensitive adhesive and steel powder is thoroughly mixed and forms a viscous ferromagnetic granular liquid mixture 23. While still in this state, the mixture 23 is applied onto a polyethylene film 24. Film 24 is preferably 2 mils thick and is coated on one side with silicone. Film 24 is sufficiently wide to substantially span the area of the base 11 side-to-side, which is covered with the hook-like projections 18 while not extending over onto the flanges 12 and 13. This is shown in FIG. 4.

The coating mixture 23 is applied to the side of the film 24 not coated with the silicone and therefore sticks firmly to the film 24. The mixture 23 is applied to provide steel powder on the film 24 at a rate of 200 grams per meter squared. Other rates of application, for example between the rates of 50 and 300 grams per meter squared are possible dependant on the size and width of the particular fastening member, the strength of the magnets and similar considerations.

Figure 5:
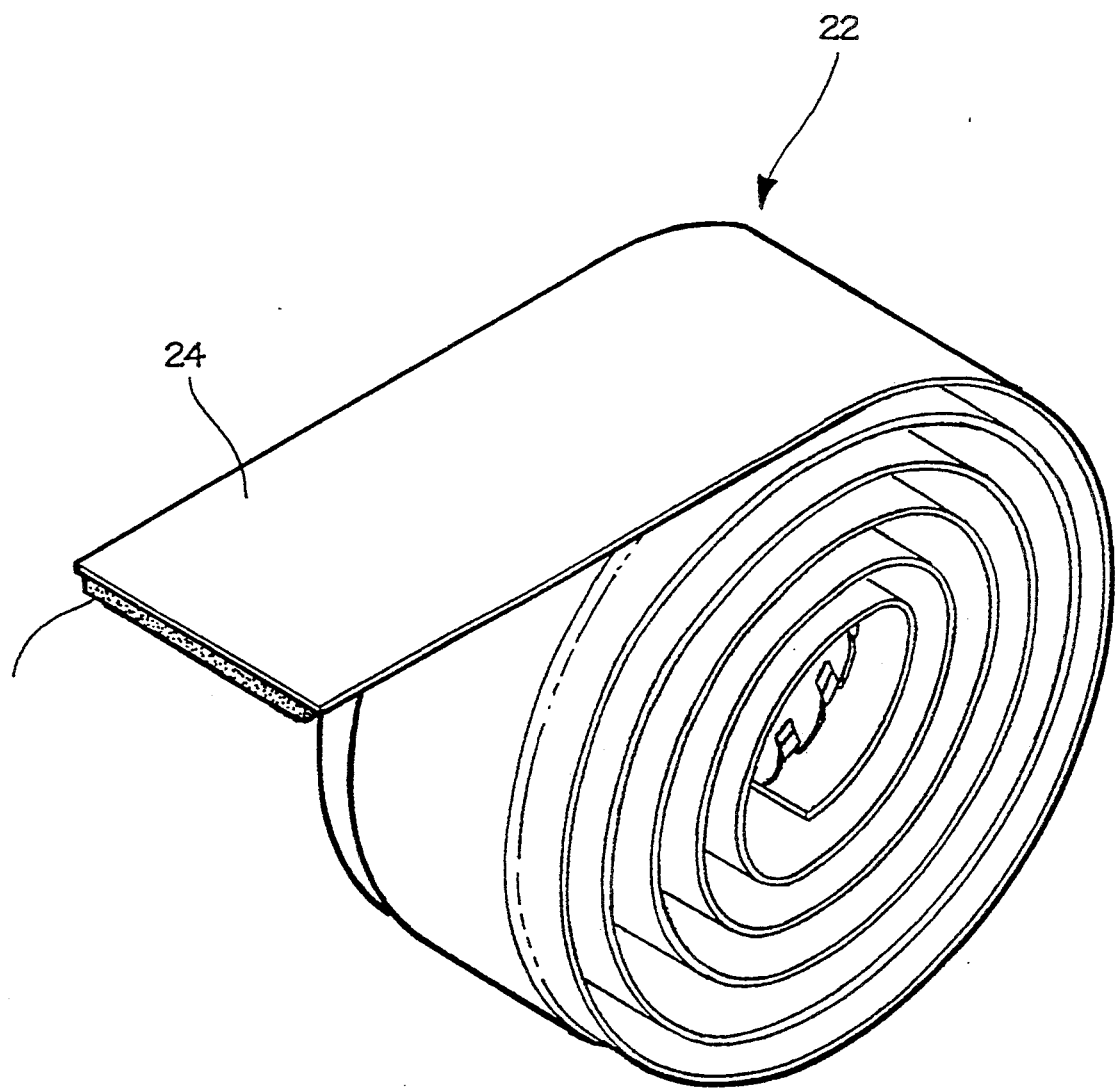
FIG. 5 is a perspective view showing the attachment strip coiled onto itself before assembly with the base and protective film to form the fastening member.

The coating mixture 23 sticks to the non-silicone-coated side of the film 24, but not to the silicone-coated side. Thus, the magnetic attachment strip 22 may be rolled onto itself to form an easy to use roll. See FIG. 5. Since the coating mixture does not stick to the silicone-coated side of the film 24, the roll of magnetic attachment strip 22 may be unrolled for application to the base 11.

The fastening member 10 is assembled by unrolling the magnetic attachment strip 22 onto the base 11 in a continuous process. The magnetic attachment strip 22 is sandwiched between the base 11 and the temporary protective film 20, both of which are also unrolled from large rolls. As the dried coating mixture 23 detaches from the silicone-coated side of the film 24, it bonds to the adjacent side of the protective film 20, forming a unitary structure. Thus, the coating mixture 23 is sandwiched between and bonded to the film 20 on one side and film 22 on the other side.

Note in FIGS. 3 and 4 that the protective film 20 is sufficiently wide to extend over onto and overlap the flanges 12 and 13 so that the film can be bonded to the flanges 12 and 13 and thereby seal the hook-like projections 18 against intrusion of molding liquid. In contrast, the attachment strip 22 is substantially the same width as the coating mixture 23 and resides only over the area covered by the hook-like projections 18.

The fastening member 10 is held firmly in the mold pocket 50 by the magnetic attraction between the very small granules of steel powder in the coating mixture 23 and the magnets 52 in the mold pocket 50. When the molding process is complete, the temporary protective film 20 is torn from the fastening member 10. The tear takes place at the inner edge of the hot melt adhesive strips 21 on opposite side edges of the fastening member 10, exposing the hook-like projections 18 and thereby readying the cushion to receive the upholstery.

While the fastening member 10 is shown using hooks 18 intended to interconnect with fibrous patches, other types of gripping fasteners are also suitable for use with the invention according to this application. These include gripping fasteners of the type which use identical first and second sets of interlocking members, such as mushroom or arrow-shaped projections.

Figure 7:
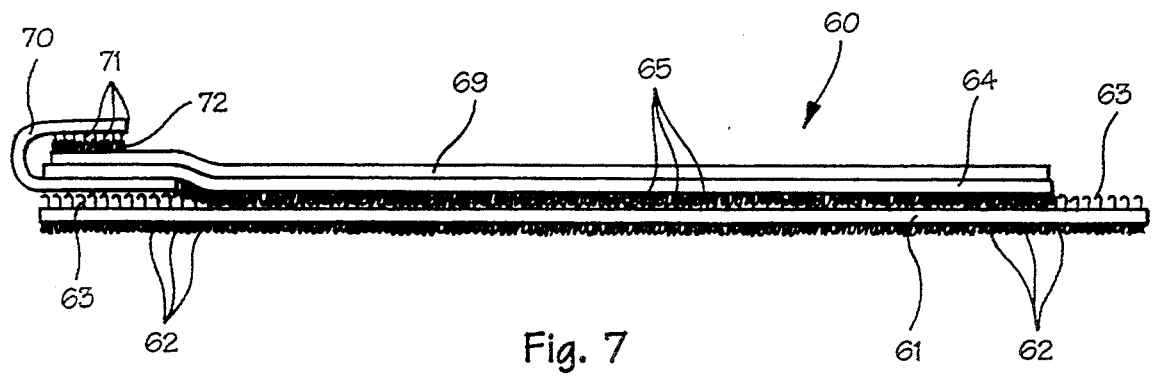
FIG. 7 is a side elevation of a fastening member according to another embodiment of the invention.

An alternate embodiment of a fastening member according to the invention is shown in FIG. 7 and indicated at broad reference numeral 60. Fastening member 60 includes a base 61 having fibrous loops 62 on one face and rows of hook-like projections 63 on the obverse face. The face of the base 61 having the rows of hook-like projections 63 is placed face down in the mold pocket 50, with the loops on the other face being exposed to the molding liquid. As the molding liquid cures, the fastening member 60 is molded into the cushion by the loops 62.

The hook-like projections 63 are protected from contamination and clogging by the molding liquid by a cover 64 which extends along the length of the base 61 and is coextensive in width therewith. One face of the cover 64 is covered with fibrous loops 65 which fasten to and mate with the hook-like projections 63 on the adjacent face of the base 61. The contact between the hook-like projections 63 and the fibrous loops 65 is sufficiently intimate that intrusion of molding liquid into the area of the base 61 covered by the hook-like projections 63 is prevented.

Figure 8:
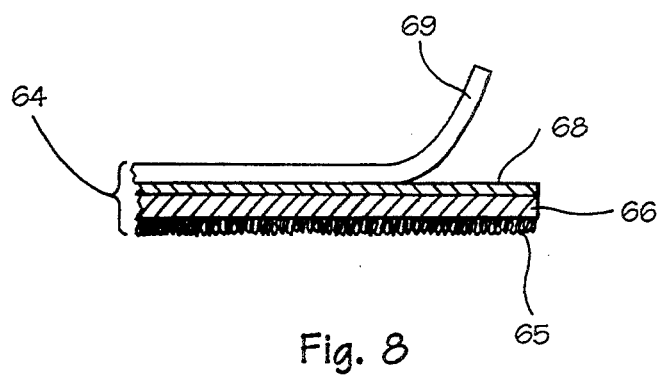
FIG. 8 is a fragmentary cross-section of the cover of the fastening member shown in FIG. 7.

As is shown in FIG. 8, the cover 64 is itself comprised of four layers—the loops 65, a substrate 66 which carries the loops 65 on one of its faces, and a layer which comprises an attachment strip 68. The attachment strip 68 comprises an adhesive mixed with steel powder to form a mixture which is then coated onto a carrier sheet 69, which may be paper or a similar material. Paper is preferred if a moderate amount of rigidity is to be added to the fastening member 60. Otherwise, a thin film may be used, as described with reference to the fastening member 10.

The fastening member 60 includes means for easily removing the cover 65 once the molding operation is complete. One end of the cover includes a tab 70 bonded thereto and extending beyond the end of the base 61. One face of the tab 70 is provided with hooks 71. A small patch of fibrous loops 72 is attached to the top face of the carrier sheet 69 on the same end of the base 61. The tab 70 is folded over top of the end of the carrier sheet so that the hooks 71 connect with the fibrous loops 72.

After molding is complete and the molding liquid has cured and solidified, the tab 70 is grasped and pulled away from the base 61. The cover 64 and the overlying carrier sheet 69 are easily pulled away from the base 61 of the fastening member 60, which remains firmly imbedded in the cured foam.

Figure 9:
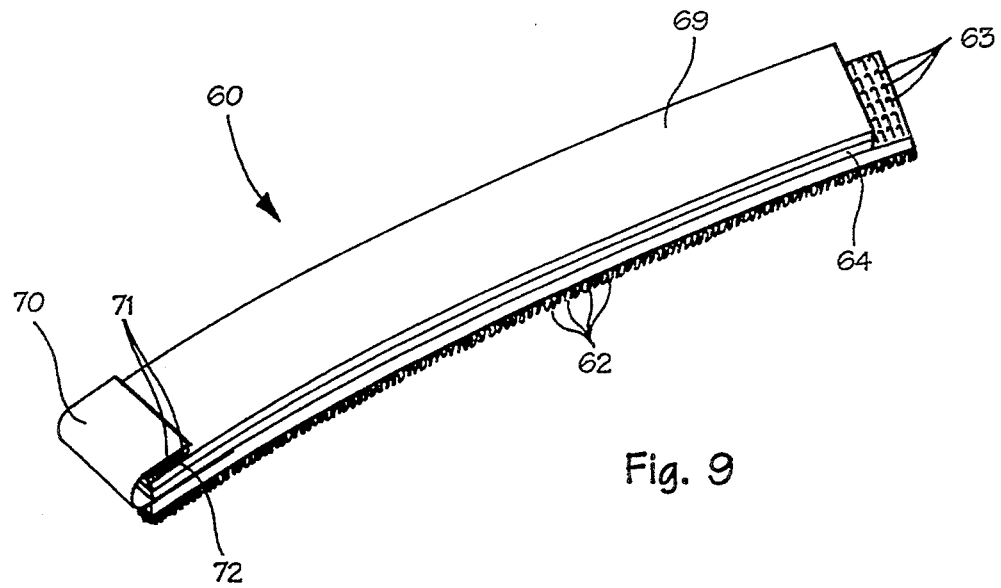
FIG. 9 is an overall perspective view of the fastening member shown in FIGS. 7 and 8, and particularly showing that the fastening member can be curved along its longitudinal axis.

As is shown in FIG. 9, the fastener strip 60 is particularly well adapted to be formed into pieces which are curved such that an individual length of fastener strip 60 defines a predetermined arc to which a straight line of would be tangent. The curve permits fastener assemblies to be molded into cushions which themselves have curves at the areas where the seat cover is to be attached to the foam seat cushion.

A fastening member having a ferromagnetic attachment strip is described above. Various details of the invention may be changed without departing from its scope. Furthermore, the foregoing descriptions of the preferred embodiments of the invention and the best mode for practicing the invention are provided for the purpose of illustration only and not for the purpose of limitation—the invention being defined by the claims.

I claim:

1. In a fastening member characterized by having a base carrying on one side thereof a first part of a gripping fastening member for mating connection with a complementary second part of a gripping fastening member, and a temporary cover engaging the base for protecting the first gripping fastener part against leakage of molding liquid past the temporary cover onto the first gripping fastener part to protect the first gripping fastener part against clogging by a molding liquid when molding the fastening member into a molded article in a mold, the temporary cover comprising a flexible, granular ferromagnetic attachment strip positioned in overlying relation on top of the first gripping fastener part and extending along the length of the fastening member for being attracted to a magnet in the mold to temporarily hold the fastening member by magnetic attraction in the mold during the molding process, and a tab carried on the end of the cover for permitting the cover to be easily and quickly removed by gripping and pulling the cover free of said first gripping fastener part the after the molding operation is completed.

2. In a fastening member according to claim 1, wherein said first gripping fastener part comprises an array of hook-like projections for mating engagement with complementary projections carried by said cover.

3. In a fastening member characterized by having a base carrying on one side thereof a first part of a gripping fastening member for mating connection with a complementary second part of a gripping fastening member, and a temporary thin protective cover covering and sealingly engaging the base for enclosing the first gripping fastener part against leakage of molding liquid past the cover onto the first gripping fastener part to protect the first gripping fastener part against clogging by a molding liquid when molding the fastening member into a molded article in a mold, the improvement comprising a flexible, granular ferromagnetic attachment strip positioned in overlying relation on top of the first gripping fastener part and extending along the length of the fastening member within the area enclosed by the temporary thin protective cover for being attracted to a magnet in the mold to temporarily hold the fastening member by magnetic attraction in the mold during the molding process, and a tab carried on the end of the thin protective cover for permitting the cover to be easily and quickly removed by gripping and pulling the cover free of said first gripping fastener part the after the molding operation is completed.

4. In a fastening member according to claim 2, wherein said complementary projections carried by said cover comprise fibrous loops.

5. A fastening member according to claim 1 or 2, wherein said cover comprises:
   (a) a layer of fibrous loops for mating connection with a plurality of hooks comprising said first gripping fastener part for securing the cover to the base;
   (b) a substrate for carrying said layer of fibrous loops; and
   (c) said flexible, granular ferromagnetic attachment strip positioned on face of the substrate obverse from the fibrous loops; and
   (d) a paper carrier sheet releasably attached to said ferromagnetic attachment strip.

6. A fastening member according to claim 1 or 2, wherein said tab is integrally formed with and comprises an extension of the cover, and further wherein said tab is folded over itself and releasably attached to the cover.

7. In a fastening member according to claims 1 or 2, including tab retaining means for retaining said tab in a flush position against said cover until removal of the cover.

8. In a fastening member according to claim 7, wherein said tab retaining means comprises hook-like projections carried by a surface of said tab, and loops for mating attachment to said hook-like projections on said tab carried by an adjacent, top surface of said cover.

9. In a fastening member according to claim 1 or 2, wherein said tab comprises a separate member bonded to said cover.

* * * * *